(No Model.)
L. HAAS.
CAR HEATER.
No. 470,120. Patented Mar. 1, 1892.
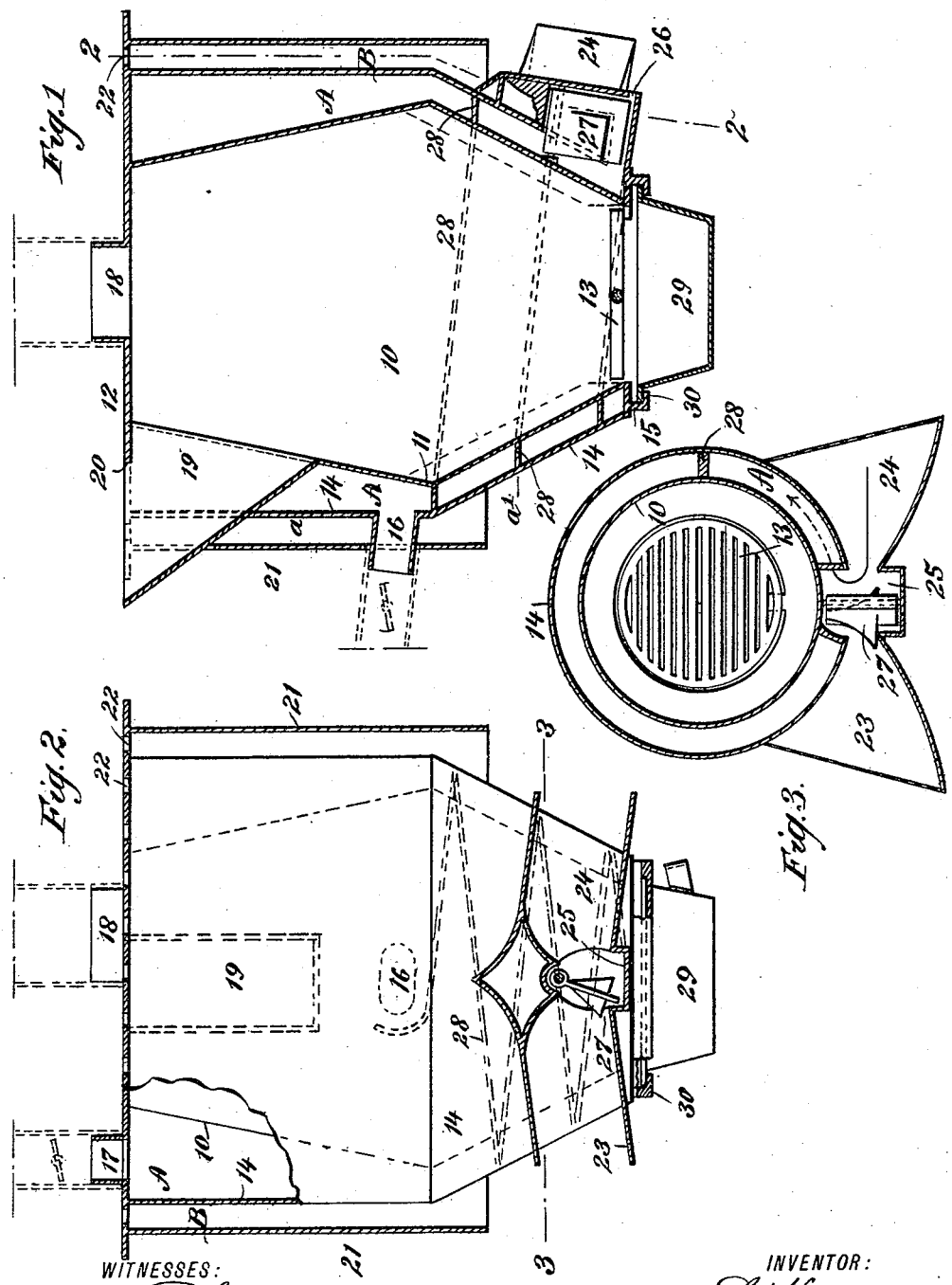
WITNESSES:
Donn Twitchell
C. Sedgwick
INVENTOR:
L. Haas
BY Munn & Co.
ATTORNEYS

UNITED STATES PATENT OFFICE.

LAWRENCE HAAS, OF GRAND CROSSING, ILLINOIS.

CAR-HEATER.

SPECIFICATION forming part of Letters Patent No. 470,120, dated March 1, 1892.

Application filed December 11, 1890. Serial No. 374,309. (No model.)

*To all whom it may concern:*

Be it known that I, LAWRENCE HAAS, of Grand Crossing, in the county of Cook and State of Illinois, have invented a new and useful Improvement in Car-Heaters, of which the following is a full, clear, and exact description.

My invention relates to an improvement in heaters, especially to car-heaters, and has for its object to provide a device of simple and durable construction, into which as the car is moved forward or backward currents of air will be directed. Said currents after being heated are adapted for warming or heating the car.

A further object of the invention is to provide a heater capable of being conveniently fed with fuel and which will heat both sides of the car equally well.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through the heater. Fig. 2 is a vertical section taken, practically, on line 2 2 of Fig. 1, and Fig. 3 is a horizontal section on the line 3 3 of Fig. 2.

The fire-pot 10 is circular in cross-section and tapered from a point 11 near the center in direction of the ends. The upper end of the fire-pot is attached to or made integral with a plate 12, which constitutes the top of the heater, and in the bottom of the fire-pot, which is open, a grate 13, preferably of the dump pattern, is pivoted. The fire-pot is surrounded by a jacket 14, whose upper wall *a* is straight, the lower wall *a'* being conformed to the contour of the lower portion of the fire-pot, as shown in Figs. 1 and 2.

The bottom edges of the fire-pot and jacket are connected by a partition 15, and the space between the fire-pot and jacket constitutes an air-heating chamber A, which is provided with a collared opening 16 in one side, adapted to receive a pipe, (shown in dotted lines, Fig. 1,) and a second collared opening 17 in the top of the heater and also adapted to receive a pipe.

A collared opening 18 is made in the top of the heater, preferably over the center of the fire-pot, and is adapted as a support for the smoke-pipe, (shown in dotted lines, Fig. 1,) and at one side of the fire-pot a hopper 19 is constructed, preferably constituting an integral portion of the pot, the upper end of which hopper is secured to the walls of an opening 20, produced in one side edge of the top of the heater. The hopper projects outward through a suitable opening in the jacket above the side opening 16 thereof.

The top of the heater is preferably rectangular, and a casing 21 is attached to or formed integral with the top near its margin, which extends downward upon each side ordinarily some distance below the center of the jacket 14, and between the casing and the jacket a chamber B is formed, open at its lower end.

In the top of the heater a series of apertures 22 is produced, leading into the chamber, as shown in Figs. 1 and 2.

Near the bottom of the jacket 14, at one side, two chutes or horizontal funnels 23 and 24 are constructed, which extend at an angle outward from the body of the jacket in opposite directions, as shown in Figs. 2 and 3. Where the funnels meet a pit 25 is formed, having a slot 26 in its front wall, and each funnel has communication with the air-heating chamber A, as shown in Fig. 3. The mouth of each funnel is preferably covered with wire-cloth to exclude dust, &c.

Within the central space between the two funnels a gravity-damper 27 is pivoted, the said damper being pivoted at its upper end, and the pivot-pin has a bearing in the inner wall of the central portion of the jacket between the funnels and in the outer wall of the fire-pot, as shown in Figs. 1 and 3. The damper extends some distance in the pit 25.

The lower portion of the fire-pot is surrounded by an exterior spiral horizontal partition 28, which partition commences at one side of the collared opening 16 of the jacket and terminates at the floor of the chamber A at one side of the opening communicating with the funnels. The partition 28 is of a width sufficient to extend from the outer wall of the fire-pot to the inner wall of the jacket 14, as illustrated in Fig. 1.

In operation the heater is usually set in the floor of the car, the top 12 being flush with the floor. The pipe connected with the collared opening 16 is adapted to convey heat to one side of the car, and the pipe connected with the upper collared opening 17 conducts the heat to the opposite side. The body of the heater is thus below the bottom of the car, and as the car is driven forward, for instance, the air will automatically close communication between the funnel 23 and chamber A and open communication between the funnel 24 and said chamber. The air entering the funnel is compelled by the partition 28 to take a circuitous course upward around the fire-pot and is thereby heated, and a portion of the heated air passes out through the collared opening 16 and the remainder through the upper collared opening 17. When the car is driven in the opposite direction, communication between the funnel 24 and the chamber A is closed and the funnel 23 is put in communication with said chamber. This is done automatically. Heated air will also pass upward through the chamber B, being heated by contact with the jacket 14, and the said heated air will find an escape into the car through the apertures 22.

Beneath the grate an ash-pan 29 is located, the said pan being adapted to fit into ways 30, secured to the partition 15, as shown in Figs. 1 and 2. The pan cannot be removed without being first lifted up, as the flanges of the pan are made to rest in recesses produced in the ways, as is best shown in Fig. 2.

Although specific construction has been shown and described, I do not confine myself thereto, as equivalent construction may be employed without departing from the spirit of the invention.

Having thus described my invention, I claim as new and desire to secure by Letters Patent—

1. A car-heater comprising a fire-pot, a jacket surrounding the fire-pot and forming a chamber between it and the fire-pot, a spiral partition in the lower part of the chamber, oppositely-arranged funnels communicating with the lower part of the chamber, and a valve pivoted between the funnels and operated by the air entering the funnels, substantially as described.

2. A car-heater comprising a fire-pot tapering from about the center toward the ends, a jacket surrounding the fire-pot and forming a chamber, said jacket having a straight upper wall and a downwardly-tapering lower wall, a spiral partition in the lower part of the said chamber, oppositely-arranged funnels communicating with the said chamber, and a valve between the funnels, substantially as herein shown and described.

3. In a car-heater, the combination, with the fire-pot 10, tapering from about the center toward the ends, of the jacket 14, having the straight upper wall $a$ and the tapering lower wall $a'$ and provided with the exit-openings 16 and 17, the spiral partition 28 between the lower parts of the jacket and fire-pot, and the oppositely-arranged funnels 23 24, substantially as set forth.

4. In a car-heater, the combination, with the fire-pot 10, having tapering ends, of the jacket 14, having the straight upper wall $a$ and the tapering lower wall $a'$ and provided with the exit-openings 16 and 17, the spiral partition 28 between the lower parts of the jacket and fire-pot, the funnels 23 and 24, communicating with the chamber between the jacket and fire-pot, a casing surrounding the jacket and open at the bottom, and a cover provided with openings leading to the space between the jacket and casing, substantially as herein shown and described.

LAWRENCE HAAS.

Witnesses:
WM. E. SWARTHOUT,
ANDREW BANDEROL.